United States Patent [19]

Drake

[11] Patent Number: 5,035,117
[45] Date of Patent: Jul. 30, 1991

[54] THERMAL ENGINE DRIVEN HEAT PUMP FOR RECOVERY OF VOLATILE ORGANIC COMPOUNDS

[75] Inventor: Richard L. Drake, Schenectady, N.Y.

[73] Assignee: Mechanical Technology Incorporated, Latham, N.Y.

[21] Appl. No.: 561,458

[22] Filed: Aug. 1, 1990

[51] Int. Cl.$^5$ .......................... F25B 7/00; B01D 51/00
[52] U.S. Cl. ............................................. 62/79; 62/93; 62/323.1; 34/27; 55/23
[58] Field of Search .................. 62/79, 93 X, 323.1 X; 34/27 X; 55/23 X

[56] References Cited

U.S. PATENT DOCUMENTS

| | | | |
|---|---|---|---|
| 4,332,092 | 6/1982 | Hansotte | 34/27 |
| 4,480,393 | 11/1984 | Flink et al. | 34/27 |
| 4,878,931 | 11/1989 | Grant | 55/23 X |
| 4,905,476 | 3/1990 | Cinacchi | 62/93 |

OTHER PUBLICATIONS

Engineering Thermodynamics, Stoever, May 1956 p. 298.

*Primary Examiner*—William E. Wayner
*Attorney, Agent, or Firm*—Joseph V. Claeys; Joseph C. Sullivan

[57] ABSTRACT

The present invention relates to a method and apparatus for separating volatile organic compounds from a stream of process gas. An internal combustion engine drives a plurality of refrigeration systems, an electrical generator and an air compressor. The exhaust of the internal combustion engine drives an inert gas subsystem and a heater for the gas. A water jacket captures waste heat from the internal combustion engine and drives a second heater for the gas and possibly an additional refrigeration system for the supply of chilled water.

The refrigeration systems mechanically driven by the internal combustion engine effect the precipitation of volatile organic compounds from the stream of gas.

20 Claims, 3 Drawing Sheets

THERMAL ENGINE DRIVEN HEAT PUMP FOR RECOVERY OF VOLATILE ORGANIC COMPOUNDS

The Government of the United States of America has rights in this invention pursuant to Contract No. DEFC07-88ID12788 awarded by the Department of Energy.

BACKGROUND OF THE INVENTION

1. Field of the Invention

The present invention relates to a system with multiple refrigeration levels for the recovery of volatile organic compounds from process gas streams The system is driven by a thermal engine for the simultaneous production of refrigeration, useful process heat and inert gas.

2. Description of the Prior Art

It is well-known in the prior art to remove volatile organic compounds (VOCs) such as solvents from process gas streams such as may occur with the desorption of a solvent concentrating adsorber (typically activated carbon) or a closed-loop process oven. Such methods have not provided a practical facility for the separation of the removed solvents, particularly water miscible solvents from the steam condensed after the desorption process. Refrigeration systems, such as disclosed in U.S. Pat. No. 4,480,393 to Flink et al have not provided a method for recovering multiple solvents with different dew point temperatures. Similar disclosures are found in U.S. Pat. Nos. 4,332,092 to Hansotte; 4,262,430 to Janson et al and 4,150,494 to Rothchild. Moreover, such systems typically are energy inefficient. Such energy efficiency is contributed to, at least in part, by the use of multiple power supplies for various components of the system. For example, prior art systems utilize utility-supplied electrical energy for refrigeration, a separate combustion system for the purpose of supplying heat for the vaporization of VOCs, and a separate inert gas generating system.

OBJECTS AND SUMMARY OF THE INVENTION

It is therefore an object of this invention to provide an energy efficient method and apparatus for the recovery of volatile organic compounds (VOCs) from an industrial process gas stream.

It is therefore a further object of this invention to provide a method and apparatus for the multiple level recovery of volatile organic compounds from an industrial process gas stream.

It is therefore a still further object of this invention to provide a method and apparatus for the recovery of volatile organic compounds from an industrial process gas stream which is not substantially inhibited by any of the desired solvents being water miscible.

It is therefore a still further object of this invention to eliminate the separate complex and expensive inert gas generating system.

It is therefore a final object of this invention to operate such a system with a single power source.

The present invention includes a thermal engine driver for the simultaneous production of refrigeration for VOC condensation, useful process heat for VOC vaporization and inert gas. The present invention further includes multiple level refrigeration using different refrigeration types and temperature levels in the cooling of solvent laden air.

More particularly, this invention includes a spark-ignited, natural gas-fueled internal combustion engine. The engine shaft work (via mechanical, hydraulic, electrical or similar means) is used to drive refrigeration equipment, an electrical generator and an air compressor. The heat rejected from the internal combustion engine is recovered and used to volatilize VOCs from the VOC emitting process such that they may be picked up by a carrier gas. A portion of the rejected heat may be used to drive a refrigeration system to provide chilled water for any associated industrial processes.

A portion of the exhaust gas from the internal combustion engine is used to further volatilize VOCs from the VOC emitting process such that they may be picked up by a carrier gas. The other portion of the exhaust gas from the internal combustion engine is directed to an inert gas subsystem and catalyzed, cooled, filtered and refrigerated (additionally, water and possibly carbon dioxide are removed) to provide an inert gas carrier to transport safely the frequently combustible VOC solvent vapor to the multiple level refrigeration system.

The multiple level refrigeration system cools the incoming solvent laden gas to its minimum temperature thereby condensing VOC vapors through the use of recuperation and returning solvent-lean gas through the use of two stages or temperature levels of refrigeration.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
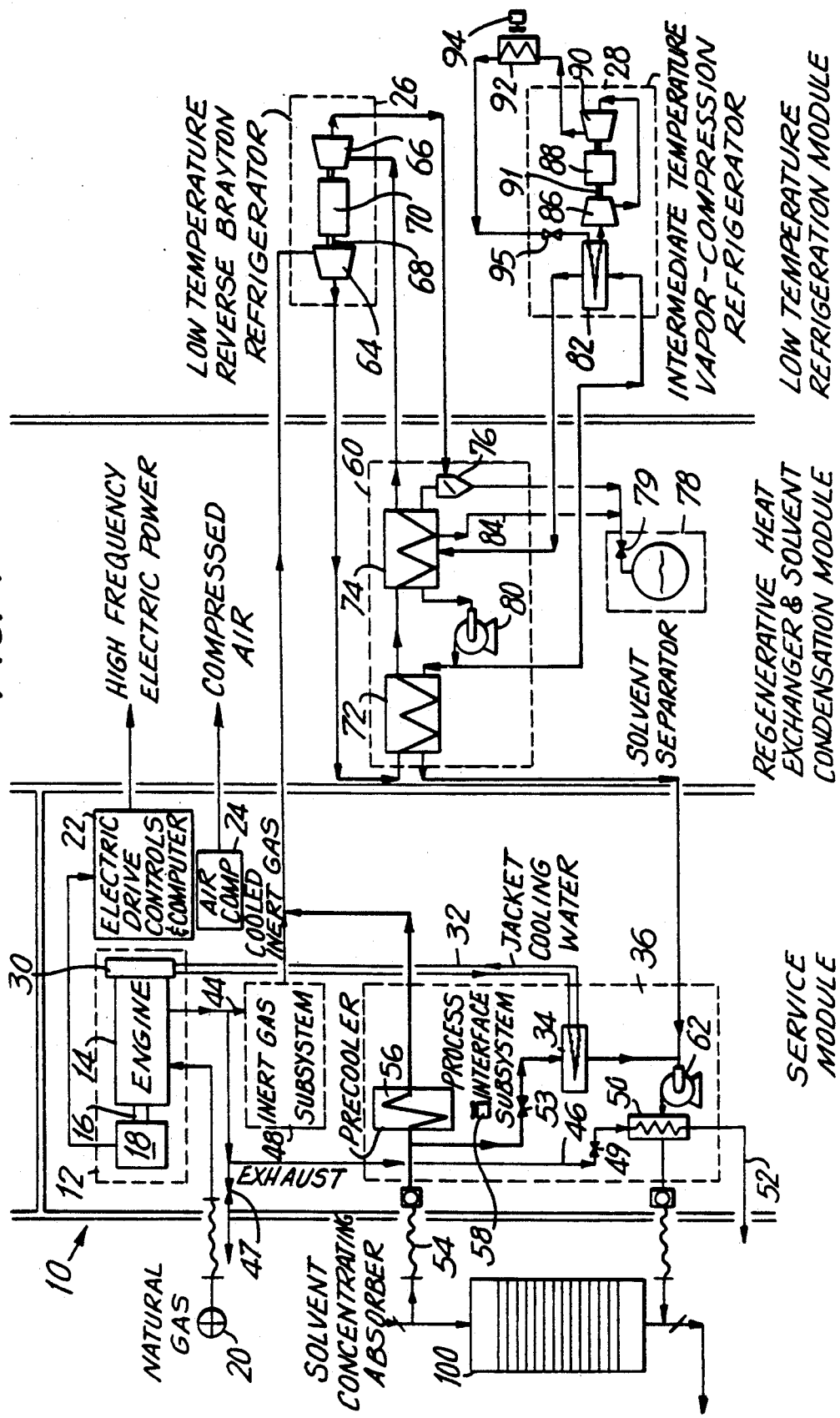
FIG. 1 is a block diagram of a first embodiment of the invention.
Figure 2:
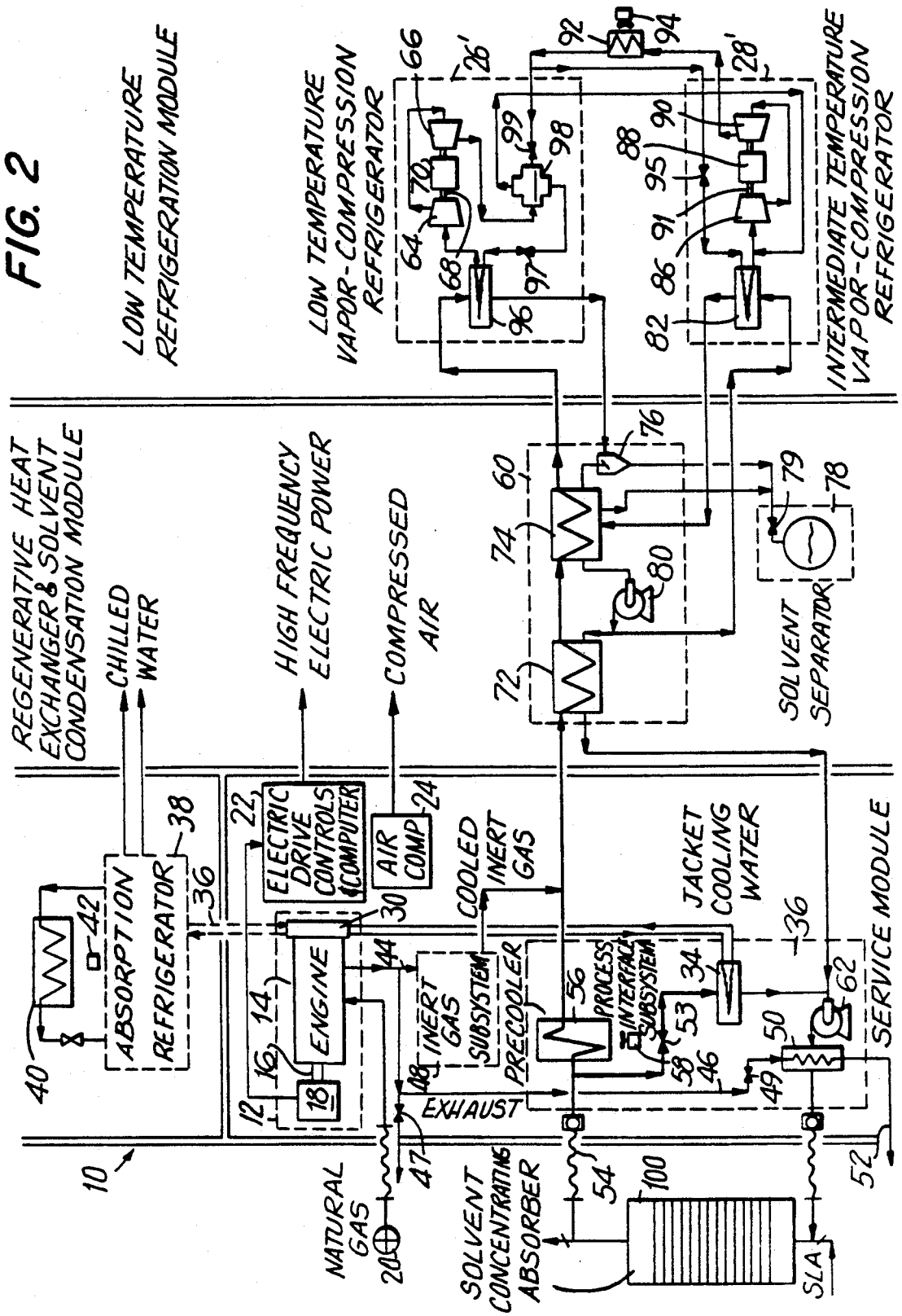
FIG. 2 is a block diagram of a second embodiment of the invention.
Figure 3:
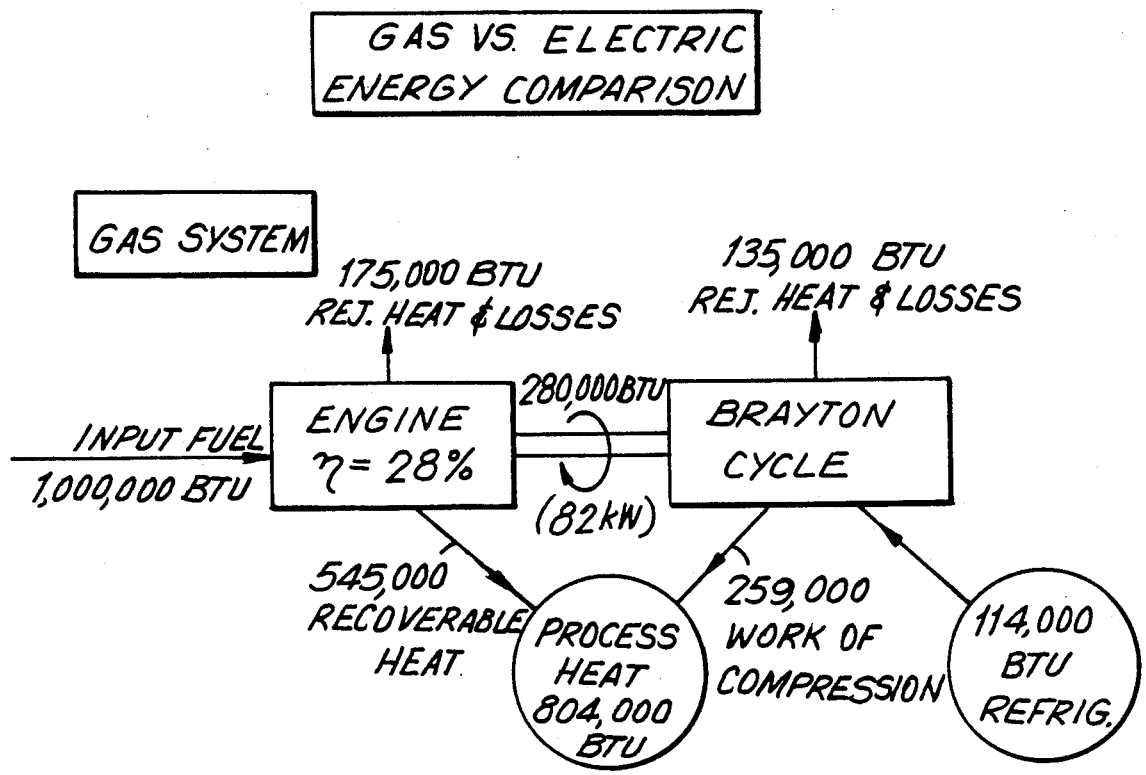
FIG. 3 and 4 are heat balance diagrams of the gas system of the present invention and the electric system of the prior art, respectively.
Figure 4:
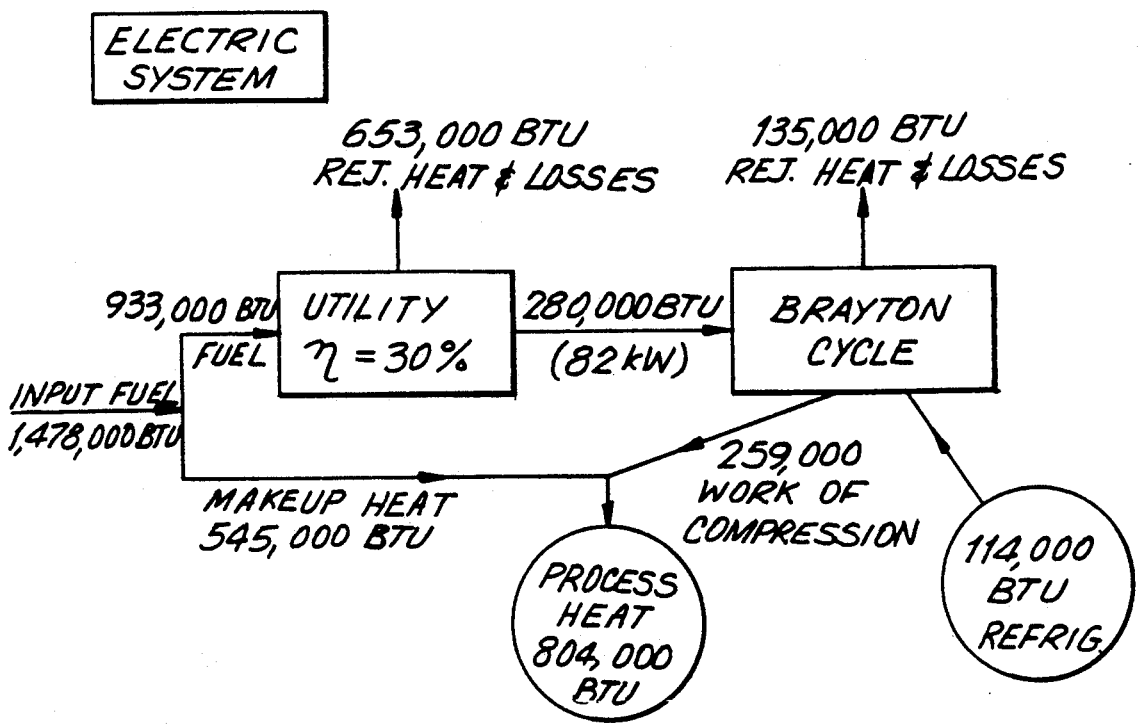

Referring now to the drawings in detail, wherein like numerals indicate like elements throughout the several views, FIGS. 1 and 2 disclose block diagrams of the first and second embodiments, respectively, of the present invention 10. Invention 10 is attached to solvent concentrating absorber 100 (which typically includes activated carbon) from which the process stream of VOC-laden gas is received. This configuration is typical for the desorption of the solvent concentrating absorber 100. Solvent concentrating absorber 100 may be replaced by a closed-loop process oven (not shown) used for the purpose of removing VOCs from a product.

FIGS. 1 and 2 disclose engine/generator module 12 which includes a thermal engine 14 with a shaft 16 driving electrical generator 18. Engine 14 is preferably a spark-ignited internal combustion engine powered by natural gas received from natural gas source 20. However, the thermal engine may be of any type (Otto, Brayton, Diesel, Stirling, etc.) using any suitable fuel. Generator 18 converts the work of engine 14 into electrical power for electric systems 22 for the instrumentation, control and powering of the various components of invention 10. Shaft 16 is further coupled to air compressor 24 and refrigeration systems 26, 28 (FIG. 1) or 26', 28' (FIG. 2). The coupling of shaft 16 to air compressor 24 and refrigeration systems 26, 28 (or 26', 28') is preferably by direct mechanical coupling. However, mechanical gears, pneumatics, hydraulics or generator/motor electrical transmission (incorporating generator 18) may alternatively be used. Compressed air from compressor 24 is provided as may be required by solvent concentrating absorber 100 or any systems associated therewith.

Thermal engine 14 is surrounded by water jacket 30 which transfers the waste heat of engine 14 via pipes 32 to heat exchanger 34 of process interface subsystem 36 (to be described) to volatilize the VOCs in the VOC-emitting process to the solvent concentrating absorber 100. Additionally, in the second embodiment, as shown in FIG. 2, water jacket 30 transfers waste heat of engine 14 via pipes 36 to absorption refrigerator 38, which includes condensor 40 and fan 42 so as to provide chilled water as may be required by solvent concentrating absorber 100 or systems associated therewith.

The exhaust of engine 14 is directed via pipes 44, 46 to inert gas subsystem 48 and heat exchanger 50 of process interface subsystem 36. The exhaust is catalyzed, cooled, filtered and refrigerated by the inert gas subsystem 48 so as to provide an inert gas to the system so as to be eventually passed to solvent concentrating absorber 100 to safely move the combustible solvent vapor away therefrom. Subsequent refrigeration of the inert gas removes water, and depending upon the cycle temperature of the system, carbon dioxide, from the inert gas.

Pipe 46 includes flow diversion valves 47, 49 and leads from engine 14 to heat exchanger 50 of process interface subsystem 36 which uses the heat of the exhaust of engine 14 to further volatilize the VOCs in the VOC-emitting process to the solvent concentrating absorber 100. Heat exchanger 50 emits the exhaust gas through pipe 52.

Process interface subsystem 36 receives a VOC-laden gas stream from solvent concentration absorber 100 and systems associated therewith via pipe 54. A portion of the gas stream passes through valve 53 and is heated by the waste heat of engine 14 via water jacket 30 and heat exchanger 34 and mixed with the gas stream exiting regenerative heat exchanger 60, then pumped by blower 62, heated by the exhaust of engine 14 via heat exchanger 50, and returned to solvent concentrating absorber 100 and associated systems so as to more rapidly vaporize additional VOCs therewithin. The remaining portion of the gas stream is cooled by precooler 56 and fan 58 (so as to reduce the load on the compressor in later refrigeration cycles) and mixed with the cooled inert gas from inert gas subsystem 48 and transmitted thereafter to first refrigeration system 26 (or 26' via regenerative heat exchanger module 60 in FIG. 2).

Referring now to FIG. 1, low temperature reverse Brayton refrigerator 26 includes compressor 64 and expander 66 both on shaft 68 of motor 70. As described previously, motor 70 is driven by engine 14. Compressor 64 receives the gas mixture from inert gas subsystem 48 and process interface subsystem 36 and raises the pressure and the temperature thereof. The output of compressor 64 is cooled at constant pressure by heat exchangers 72 and 74 of regenerative heat exchanger module 60 and then expanded by expander 66 (lowering the pressure and temperature while maintaining a constant entropy). The output of expander 66 is received by chamber 76 where a portion of the VOCs precipitates into solvent separator 78 which includes expansion valve 79. The remaining portion of the gas stream is transmitted from chamber 76 to heat exchanger 74 where the temperature of the gas stream is increased, mixed with some output from intermediate temperature vapor-compression refrigerator 28 and transmitted to blower 80. A portion of the output from blower 80 is transmitted to heat exchanger 72 where it is further increased in temperature and returned to blower 62 of the process interface subsystem 36.

The remaining portion of the output from blower 80 is transmitted to the primary side of heat exchanger 82 of intermediate temperature vapor-compression refrigerator 28 where the gas is cooled and returned to heat exchanger 74 where a portion of the VOCs from the stream precipitates via pipe 84 to solvent separator 78. The precipitation via chamber 76 and pipe 84 to solvent separator 78 is at different temperatures and therefore has different mixes of VOCs.

The secondary side of heat exchanger 82 communicates with intermediate temperature vapor-compression refrigerator 28 including compressor 86, motor 88 (driven by engine 14), compressor 90, condensor 92, fan 94 and expansion valve 95 wherein compressors 86 and 90 are driven by shaft 91 of motor 88.

FIG. 2 discloses a similarly configured regenerative heat exchanger module 60 and solvent separator 78. However, the output of inert gas subsystem 48 and process interface subsystem 36 is received by heat exchanger 72 of regenerative heat exchanger module 72. The output of heat exchanger 74 is received by heat exchanger 96 of low temperature vapor-compression refrigerator 26' (i.e., the first refrigeration cycle being a vapor-compression cycle rather than a reverse Brayton cycle). The primary side of heat exchanger 96 receives the process gas stream whereas the secondary side of heat exchanger 96 receives refrigerant.

Low temperature vapor-compression refrigerator 26' further includes compressors 64 and 66 driven by shaft 68 of motor 70. Expansion valve 97 is within the low temperature vapor-compression refrigerator 26'. Low temperature vapor-compression refrigerator 26' further includes direct contact condenser 98 through which the lower temperature refrigerant cycle is heat exchanged with the higher temperature refrigerant cycle vapor-compression refrigerator 28' thereby reducing the load on low temperature vapor-compression refrigerator 26' and increasing system efficiency under chosen circumstances.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An apparatus for separating volatile organic compounds from a stream of gas, including:
   an internal combustion engine including a rotating shaft;
   an inert gas generating means for converting at least a portion of exhaust from said internal combustion engine into an inert gas and mixing said inert gas into said stream of gas;
   heat transfer means for recovering waste heat from said internal combustion engine to heat a portion of said stream of gas;

a first and a second refrigeration system operatively connected to said rotating shaft of said internal combustion engine, said first and said second refrigeration systems operating at substantially different temperatures, said first and second refrigeration systems receiving said stream of gas and cooling said stream of gas thereby extracting the volatile organic compounds therefrom.

2. The apparatus of claim 1 further including means for heating said stream of gas using at least a portion of exhaust from said internal combustion engine.

3. The apparatus of claim 2 wherein said internal combustion engine mechanically drives a generator to provide electricity for controlling said apparatus.

4. The apparatus of claim 3 further including a process interface subsystem comprising:
means for separating an input of said stream of gas into a first and a second substream;
cooling means receiving said first substream, said cooling means and said inert gas generating means communicating with said first refrigeration system;
a first heat exchanger communicating with said heat transfer means to heat said second substream;
a blower receiving said second substream and communicating said second substream to said means for heating;
said means for heating providing an output of said stream of gas.

5. The apparatus of claim 4 wherein said first refrigeration system comprises a reverse Brayton cycle, including a first motor operatively attached to said internal combustion engine, and a first compressor and a first expander operatively attached to said first motor, said first compressor receiving said first substream, including inert gas from said inert gas generating means, from said cooling means and communicating said first substream to a regenerative heat exchange means.

6. The apparatus of claim 5 wherein said regenerative heat exchange means cools and communicates said first substream from said first compressor to said first expander.

7. The apparatus of claim 6 wherein said first expander communicates said first substream to a chamber within said regenerative heat exchange means wherein a third substream, including the volatile organic compounds, precipitates therefrom to a solvent separator.

8. The apparatus of claim 7 wherein said regenerative heat exchange means combines a fourth substream from said second refrigeration system into said first substream, precipitates therefrom a fifth substream, including the volatile organic compounds, to a solvent separator, and communicates said first substream to be combined with said second substream to said pump.

9. The apparatus of claim 8 wherein said second refrigeration system comprises a vapor-compression cycle, including a second heat exchanger, a second motor operatively attached to said internal combustion engine, and a second compressor operatively attached to said second motor, wherein a primary side of said second heat exchanger communicates said fourth substream to and from said regenerative heat exchange means and wherein a secondary side of said second heat exchanger receives refrigerant from said vapor-compression cycle.

10. The apparatus of claim 4 wherein said first refrigerant system comprises a vapor-compressed cycle, including a first motor operatively attached to said internal combustion engine, and a first compressor operatively attached to said first motor, said first compressor on a secondary side of a second heat exchanger, said first substream including inert gas from said inert gas generating means being received on a primary side of said second heat exchanger via a regenerative heat exchange means.

11. The apparatus of claim 10 wherein said regenerative heat exchange means cools and communicates said first substream from said cooling means to said second heat exchanger.

12. The apparatus of claim 11 wherein said second heat exchanger communicates said first substream to a chamber within said regenerative heat exchange means wherein a third substream, including the volatile organic compounds, precipitates therefrom to a solvent separator.

13. The apparatus of claim 12 wherein said regenerative heat exchange means combines a fourth substream from said second refrigeration system into said first substream, precipitates therefrom a fifth substream, including the volatile organic compounds, to a solvent separator, and communicates said first substream to be combined with said second substream to said pump.

14. The apparatus of claim 13 wherein said second refrigeration system comprises a second vapor-compression cycle, including a third heat exchanger, a second motor operatively attached to said internal combustion engine, and a second compressor operatively attached to said second motor, wherein a primary side of said third heat exchanger communicates said fourth substream to and from said regenerative heat exchanger and wherein a secondary side of said second heat exchanger receives refrigerant from said second vapor-compression cycle.

15. The apparatus of claim 14 wherein refrigerant is exchanged between said first and said second refrigeration systems.

16. The apparatus of claim 15 wherein said first refrigeration system includes a condenser for exchange of refrigerant between said first and said second refrigeration systems.

17. The apparatus of claim 16 further including a third refrigeration system driven by said heat transfer means to provide chilled water.

18. A method for separating volatile organic compounds from a stream of gas including the steps of:
providing an internal combustion engine;
using a water jacket on said internal combustion engine to direct a portion of waste heat from said internal combustion engine to heat a portion of said stream of gas;
combining inert gas from an inert gas generating system driven by exhaust from said internal combustion engine with said stream of gas;
using a mechanical output of said internal combustion engine to drive at least two refrigeration systems at substantially different temperatures to precipitate volatile organic compounds from said stream of gas, said at least two refrigeration systems causing the precipitation of volatile organic compounds from said stream of gas;
collecting the volatile organic compounds;
using a portion of exhaust from said internal combustion engine to heat said stream of gas prior to egress from the apparatus;
using a portion of exhaust from said internal combustion engine to drive an inert gas generating system prior to egress from the apparatus.

19. The method of claim 18 further including the step of using mechanical output from said internal combustion engine to drive an electric generator.

20. The method of claim 19 further including the step of using said water jacket to drive a third refrigeration system to provide chilled water.

* * * * *